United States Patent
Farley et al.

(10) Patent No.: US 7,980,071 B2
(45) Date of Patent: Jul. 19, 2011

(54) DISTENSIBLE TUBE WAVE ENERGY CONVERTER

(75) Inventors: Francis James Macdonald Farley, Le Bar-sur-Loup (FR); Roderick Charles Tasman Rainey, Bath (GB)

(73) Assignee: Atkins Limited (GB)

(*) Notice: Subject to any disclaimer, the term of this patent is extended or adjusted under 35 U.S.C. 154(b) by 521 days.

(21) Appl. No.: 12/162,889

(22) PCT Filed: Jan. 23, 2007

(86) PCT No.: PCT/GB2007/000201
§ 371 (c)(1),
(2), (4) Date: Jul. 31, 2008

(87) PCT Pub. No.: WO2007/088325
PCT Pub. Date: Aug. 9, 2007

(65) Prior Publication Data
US 2009/0007557 A1    Jan. 8, 2009

(30) Foreign Application Priority Data
Feb. 4, 2006 (GB) .................................. 0602278.4

(51) Int. Cl.
*F03B 13/14* (2006.01)
*F03B 13/18* (2006.01)

(52) U.S. Cl. ................... 60/398; 60/504; 290/53
(58) Field of Classification Search ........... 60/398, 60/502, 504; 290/53
See application file for complete search history.

(56) References Cited

U.S. PATENT DOCUMENTS

| | | | |
|---|---|---|---|
| 3,353,787 A | * | 11/1967 | Semo .............................. 60/325 |
| 3,818,704 A | * | 6/1974 | Lapeyre ......................... 60/398 |
| 4,145,882 A | | 3/1979 | Thorsheim |
| 2003/0184096 A1 | | 10/2003 | Newman |

FOREIGN PATENT DOCUMENTS

| | | |
|---|---|---|
| DE | 2704129 | 8/2007 |
| GB | 2024957 | 1/1980 |
| GB | 2054756 | 2/1981 |
| GB | 2075127 | 11/1981 |
| GB | 2081387 | 2/1982 |
| GB | 2133477 | 7/1984 |
| SU | 1129407 | 12/1984 |
| WO | WO 03033824 | 4/2003 |
| WO | WO 2007015269 A1 * | 2/2007 |
| WO | WO 2007/088325 | 8/2007 |

OTHER PUBLICATIONS

International Search Report for PCT/GB2007/000201, May 22, 2007, EPO.
International Preliminary Report on Patentability, International Application PCT/GB2007/000201, Dec. 4, 2007, EPO.
Search Report for Application No. GB0602278.4, Jun. 9, 2006, UK Patent and Trademark Office.
Search Report for application No. GB1100606.1, May 1, 2011, UK Intellectual Property Office.

* cited by examiner

*Primary Examiner* — Thomas E Lazo
(74) *Attorney, Agent, or Firm* — Bourque and Associates, PA (57) ABSTRACT

A generally horizontal distensible tube (1) in the sea containing fluid and oriented in the direction of wave travel, the distensibility being chosen so that the propagation velocity of pressure waves inside the tube (bulge waves) is the same as the velocity of propagation of the waves in the sea. Energy is then transferred from the ocean waves to the bulge wave. Energy extraction means (84, 85) at the stern and/or bow convert the bulge power to useful energy. Said energy extraction means may comprise pistons actuating pumps or linear or rotating generators, or one-way valves allowing the bulge wave to pump fluid via hydraulic accumulators through a turbine. The walls of the distensible tube (1) may be comprised partly of elastomer (86) and partly of inelastic flexible polymer coated fabric (87).

20 Claims, 6 Drawing Sheets

DISTENSIBLE TUBE WAVE ENERGY CONVERTER

TECHNICAL FIELD

The invention relates to an apparatus for extracting useful energy from the waves of the sea.

BACKGROUND ART

James Lighthill in reference [1] shows how pressure waves can propagate along a distensible tube. The pressure causes the tube to dilate locally and this reduces the velocity of propagation. The more distensible the tube, the slower is the wave velocity. It is convenient to refer to these waves in the tube as "bulge waves". Lighthill applies his analysis to blood flow in arteries. This invention, on a much larger scale, applies the same principle to extract energy from ocean waves. A long distensible tube full of water is oriented in the direction of wave propagation and the velocity of the bulge wave inside the tube is more or less equal to the velocity of the ocean waves outside. In this case energy is transferred from the ocean to the bulge wave which grows along the length of the tube. At the end of the tube a piston or other means is used to capture the energy of the bulge wave and generate useful power.

Many prior wave energy inventions use flexible membranes and/or tubes oriented in the direction of wave travel, but none appear to rely on the distensibility of a tube made (or partly made) of an elastic material, as a means of storing wave energy prior to conversion. The novelty of this invention is the use of a tube with elastic walls carrying bulge waves matched to the velocity of the ocean waves.

DISCLOSURE OF THE INVENTION

Definitions

Elastic: A substance, material or object is elastic if it can be deformed by an applied force and return to its original shape when the force is removed. An elastic object obeys Hooke's law that the strain produced is substantially proportional to the applied stress. All solid materials are more or less elastic up to some limiting strain. For example the limiting strain for steel is about 0.1% while for rubber the limiting strain may be around 50%. By highly elastic we mean a substance, material or object for which the limiting strain is greater than 5%. The elasticity of an object depends upon its shape as well as the material from which it is made. Thus a helical spring made of steel can be highly elastic in the direction of its principal axis, although the steel itself is not.

Distensible: A tube is distensible if it responds to changes of internal pressure with a proportional change of its cross-sectional area from its undisturbed value. Distensible tubes have highly elastic walls, either because they are made of elastic material or because they are in some way folded or corrugated. For a tube of cross-sectional area S with internal pressure p, the distensibility is defined as $$D = (1/S) dS/dp \qquad (1).$$

It is important for this invention to distinguish between distensibility and flexibility: some examples may make this clear. A motor car tyre is flexible but not distensible: when inflated it is elastic for small deformations. The inner tube of the motor car tyre is distensible. An inflatable boat is flexible but not distensible: its size does not vary with the inflation pressure. This is because inflatable boats are made of reinforced elastomeric sheet which is flexible but not highly elastic.

Bulge wave: As described by Lighthill in reference [1], in a distensible tube a longitudinal pressure wave, associated with a change of cross-section and a longitudinal fluid velocity, can propagate along the tube. This wave is called a bulge wave. The velocity of propagation of the bulge wave is c where $c^2 = 1/(\rho D)$, $\rho$ is the density of the fluid inside and D the distensibility as defined above in equation (1).

Bow and stern: For a long object in the sea oriented generally in the direction of wave propagation, the end facing into the waves will be referred to as the bow: the other end facing in the direction of propagation will be referred to as the stern.

According to this invention in its first characteristic the wave energy converter comprises a long distensible tube, generally horizontal, immersed or partially immersed in the sea and oriented generally in the direction of wave propagation, said tube being open or closed at the bow and furnished with energy extraction means at one or both ends, the distensibility of the tube being chosen so that the velocity of the bulge wave along the tube is generally equal to or close to the velocity of the waves in the surrounding sea.

The tube is filled with water or other liquid of similar density which may with advantage be at a pressure higher than that in the surrounding sea.

According to the invention the cross-section of the distensible tube may be of any shape and the elasticity of the walls may vary around the circumference, part of the circumference in some embodiments being substantially inelastic. Furthermore the shape, size and elasticity of the cross-section, and consequentially the distensibility, may with advantage vary along the length of the tube.

According to the invention in its second characteristic the walls of said tube may be comprised of any highly elastic material such as natural or synthetic rubber with or without fibre reinforcement or a highly elastic arrangement of less elastic substances such as helical springs, corrugated metal or a reticulated structure of flexible membranes inflated with compressed air or other fluid.

According to the invention in its third characteristic the energy extraction means at the ends of the tube may comprise any machinery or process which is driven by the oscillating pressure and oscillating longitudinal velocity inside the tube, for example without limitation one or more turbines or pistons operating at any angle to the horizontal actuated by the water pressure inside said tube and driving hydraulic pumps or linear or rotating generators, or overtopping means allowing water inside the tube to be driven over a weir or through one or more non-return valves into a reservoir at elevated pressure, a separate non-return valve allowing water to enter the tube from the sea when the pressure inside is low, or any combination of the above.

In an alternative embodiment the energy extraction means comprises a vertical tube containing water with means for adjusting the height of the water surface and with a piston moving more or less vertically. In a further alternative the vertical tube is closed at the top except for a hole furnished with a float valve which allows air to escape but not water and is further furnished with a non-return valve leading to a hydraulic accumulator, with the effect that when the water inside the tube reaches the top of the tube the float valve closes and water is driven at high pressure into said hydraulic accumulator.

According to the invention in its fourth characteristic the distensible tube may be located on the sea bed, fixed in position by conventional attachments according to the art or ballasted with liquid or solid ballast so as to sink to the sea bed. Alternatively the tube may be fixed at some distance below the sea surface by attachment to a supporting frame attached to the sea bed. In another embodiment the distensible tube may be furnished with buoyancy means the whole being ballasted to float with said tube partly or wholly submerged. In this case the tube is held in position with moorings according to the art.

Some specific embodiments of the invention will now be described by way of example with reference to the accompanying drawings.

MODES FOR CARRYING OUT THE INVENTION

Figure 1:
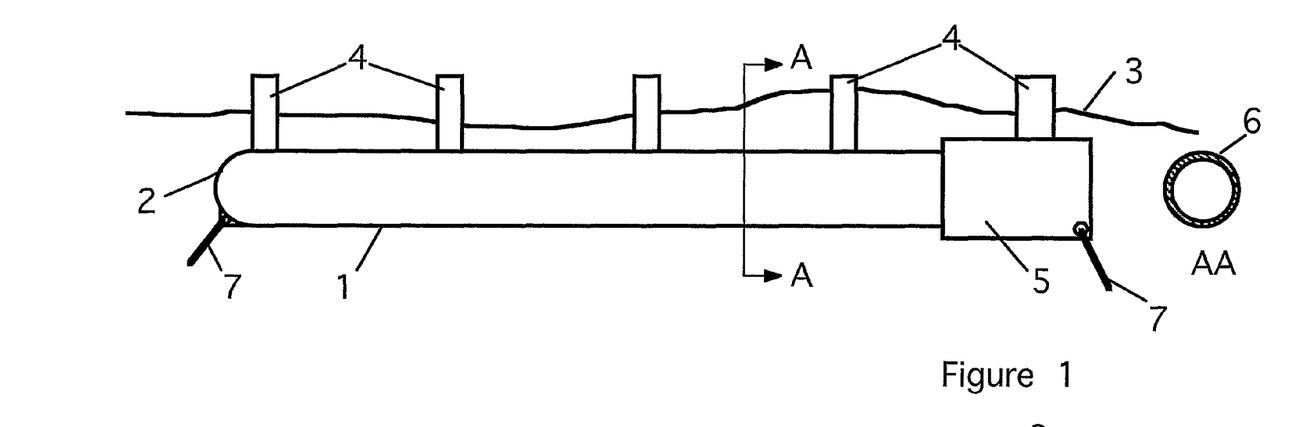
FIG. 1 shows in side elevation and in lateral cross-section a distensible tube furnished with buoyancy chambers floating close to the water surface.

Particular embodiments of the invention will now be described by way of example with reference to the figures. FIG. 1 illustrates by way of example in side elevation a long closed distensible tube 1 with rigid bow 2 furnished with a multiplicity of hollow buoyant chambers 4 with the effect that the apparatus floats with the tube 1 more or less horizontal and slightly below the sea surface 3. The device is held in position by moorings 7 according to the art. The walls of the tube 1 are highly elastic and made for example of natural or synthetic rubber as illustrated in the cross-section view AA in FIG. 1. The high elasticity of the walls has the effect of making the tube 1 distensible, the said elasticity being chosen so that the velocity of the bulge wave propagating inside the tube is close to the velocity of the waves in the sea outside. At the stern and/or bow the tube is furnished with energy extraction means 5 of which there are many alternative embodiments which will be described in detail below.

The operation of the device is as follows. The oscillating pressure and pressure gradient outside the tube wall due to the ocean waves excites a bulge wave near the bow which propagates along the tube at the bulge wave velocity. As the bulge wave moves along the tube, the ocean wave is moving along the tube at the same speed and at each point contributes a further increase in pressure. The result is a cumulative more or less linear increase in the amplitude of the bulge wave, which in effect progressively sucks energy in from the wave. Depending on its length, the oscillating internal pressure amplitude at the end of the tube can be 3-5 times the amplitude of the oscillating pressure in the ocean wave. Useful energy is then extracted from the oscillating pressure at the end of the tube, as explained in detail below. In a typical case the amplitude of the bulge wave at the stern of the tube 1 is such that the tube must expand and contract by about 50% in cross-sectional area from its undisturbed value.

Figure 2:
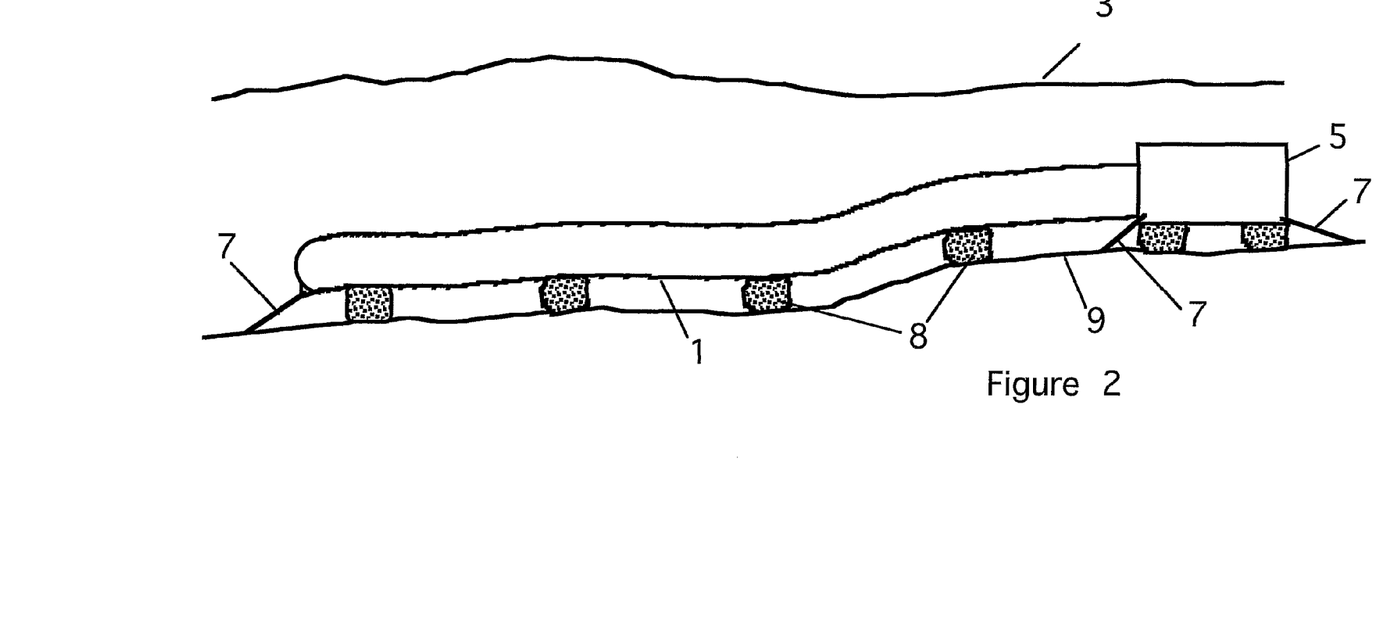
FIG. 2 shows in side elevation a distensible tube ballasted to rest on the sea floor.

In an alternative embodiment, illustrated in side elevation in FIG. 2, the distensible tube 1 is furnished on its lower surface with a multiplicity of flexible bags 8 filled with ballast means, for example without limitation sand, gravel or liquid mud, with the effect that the tube 1 is held firmly on the sea bed 9. It may be further located by means of moorings 7. In a preferred embodiment the flexible bags 8 may be joined together to comprise one long bag with the same effect. This embodiment is useful in shallow water such that the ocean waves on the sea surface 3 produce a significant pressure oscillation at the depth of the distensible tube 1, exciting a bulge wave as explained above. The tube is furnished at the stern with energy extraction means 5 of which there are many alternative embodiments which will be described in detail below. The operation of the device is similar to that described above.

Figure 3:
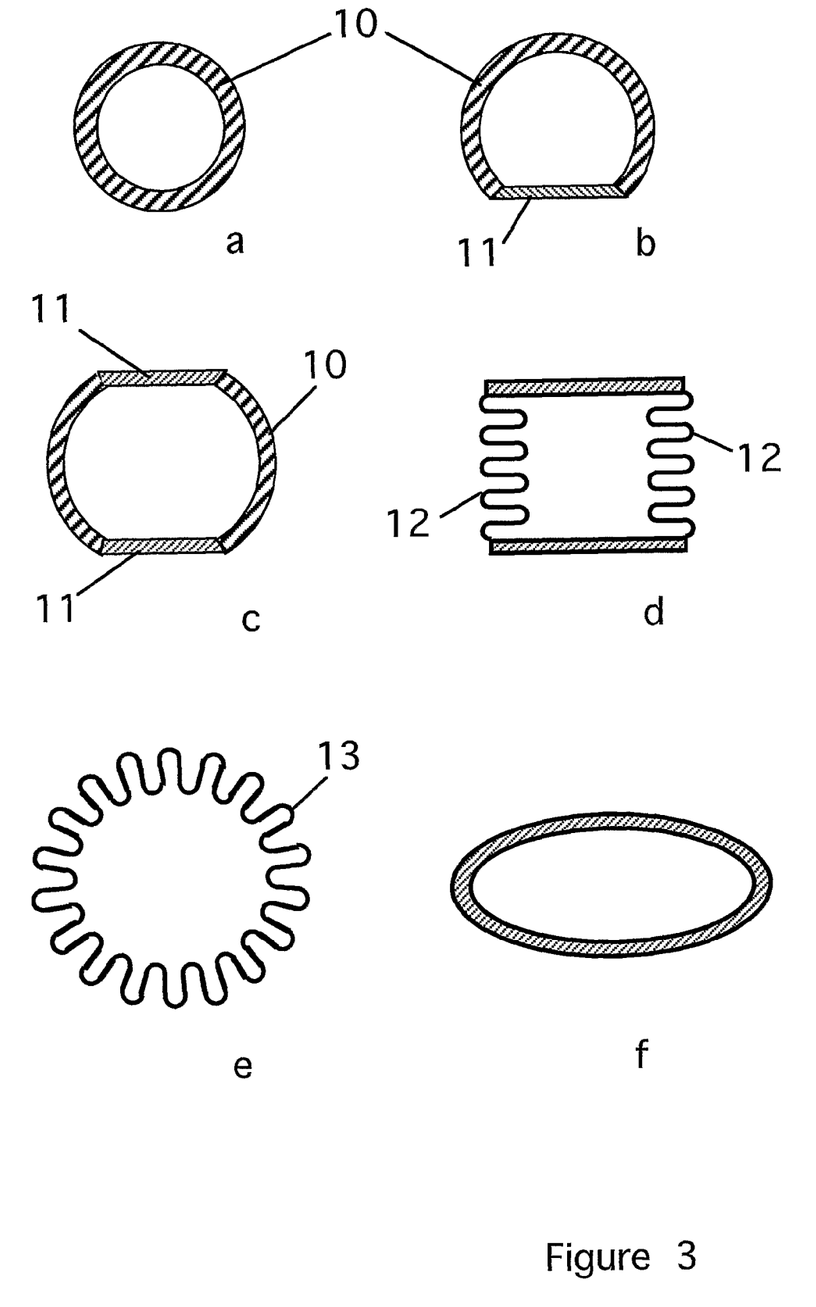
FIG. 3 shows a variety of possible cross-sections of the distensible tube.

FIG. 3 illustrates in cross-section by way of example a variety of constructions which may be adopted for the distensible tube. The cross-section may be of any shape. To achieve the large changes in cross-sectional area mentioned above, all or part of the circumference of the tube must be highly elastic. FIG. 3a illustrates an embodiment in which the walls of the tube 10 are made of natural or synthetic rubber, the elasticity of the walls being chosen to achieve the correct distensibility as specified above. The elasticity of the walls need not be the same at all points of the circumference. FIG. 3b illustrates by way of example an embodiment in which the lower side of the tube is a substantially inelastic plate 11, while the rest of the circumference 10 is highly elastic. FIG. 3c illustrates a construction in which the sides of the tube 10 are elastic but the top and bottom 11 comprise inelastic plates. In a further alternative, illustrated in FIG. 3d, the top and bottom 11 of the tube are inelastic but the sides of the tube 12 are corrugated; in this case the tube can expand and contract vertically like a conventional metal bellows, and the distensibility is controlled by the vertical spring constant of the corrugated walls. FIG. 3e illustrates an embodiment in which the whole circumference of the cross-section is corrugated, the distensibility being controlled by the circumferential spring constant of the walls. There can be any number of corrugations. FIG. 3f illustrates an embodiment in which the cross-section is normally elliptical, but can expand out to a more circular shape with greater cross-sectional area by the bending of the walls, which are effectively corrugated as in FIG. 3e, but with only two corrugations.

In a preferred embodiment illustrated in transverse cross-section in FIG. 4a the walls of the tube comprise a reticulated structure of flexible membranes, inflated by compressed air or other fluid, according to the art of inflated structures. Said membranes may be themselves highly elastic or alternatively fibre-reinforced elastomeric sheets with limited elasticity. Although the flexible membranes comprising a structure may be themselves substantially inelastic, an inflated structure can be highly elastic: well known examples are a motor car tyre and a football. The principles are illustrated in FIGS. 4b and 4c which show part of an inflated structure comprising a multiplicity of similar cells joined together in a linear array. When the cells are inflated with compressed air the upper and lower membranes adopt the shape that maximizes the volume of the cell; this is achieved when the upper and lower membranes lie on the circle circumscribing the corner points 16, 17, 18 and 19. This circle is shown by dotted lines in FIG. 4b. It will be seen that in FIG. 4b the upper and lower membranes become rather flat, with the result that in this case the structure is not significantly elastic in the horizontal direction. In FIG. 4c however the internal vertical membranes are shorter, with the effect that the upper and lower membranes, which again follow the shape of the circumscribing circle, are substantially curved. It results that the structure is highly elastic in the horizontal direction. The effective modulus of elasticity of the structure can be varied by changing the pressure inside the cells.

In the embodiment of the distensible tube illustrated in transverse cross-section in FIG. 4a, the dimensions of the cells are so chosen that the inner and outer membranes are highly curved with the effect that the wall of the enclosed hollow tube is highly elastic in the circumferential direction and the distensibility of the tube is large. The distensibility of the tube can be varied by changing the inflation pressure of the wall with the effect that the velocity of the bulge wave inside the tube can easily be adjusted from time to time to match the prevailing wave conditions. This is a major advantage of this embodiment for wave energy conversion. In some embodiments the walls of the distensible tube may be made of a highly elastic material such as natural or synthetic rubber said walls further comprising internal spaces which may be inflated with air or other fluid with the effect that the distensibility of the tube may be adjusted from time to time.

Figure 4:
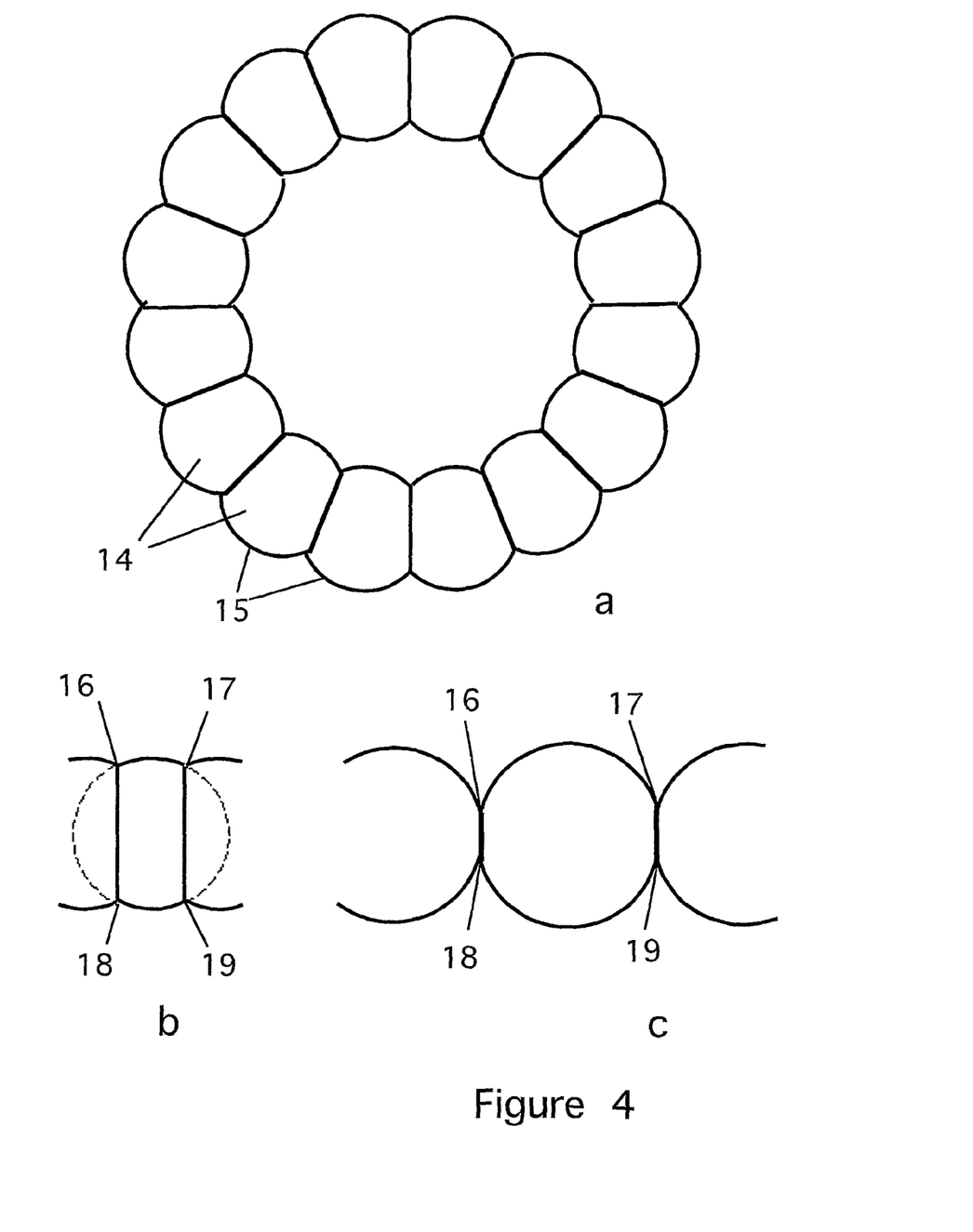
FIG. 4 shows the cross-section of a distensible tube with inflated reticulated walls.

In all the embodiments illustrated in FIGS. 3 and 4, the cross-section of the tube may be the same at all longitudinal positions along the tube. Or with advantage the dimensions or the circumferential elasticity of the cross-section may vary along the tube.

Particular embodiments of the energy extraction means mounted at the stern of the distensible tube will now be described with reference to FIGS. 5 to 10. In the embodiment illustrated by way of example in FIG. 5 a rigid cylindrical tube 20 is attached to the distensible tube 1 at its stern end. The piston 21 slides inside the rigid tube 20 and via a connecting rod 23 drives a conventional hydraulic pump 25 which delivers hydraulic fluid which may be oil, air or water to a useful output via the connecting pipes 26. The space behind the piston 21 is with advantage filled with air and vented to the atmosphere via tube 22. In operation the bulge wave propagating along the distensible tube 1 builds up to a large amplitude as it reaches the stern.

Figure 5:
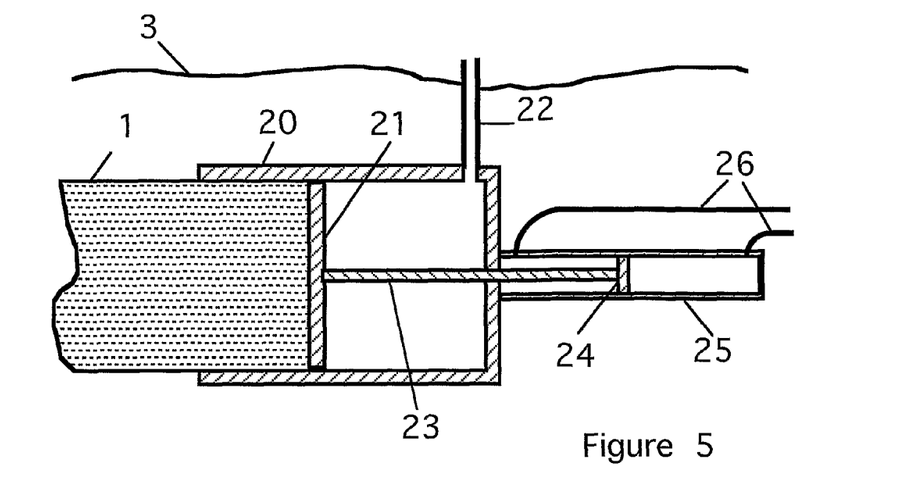
FIG. 5 shows in lateral longitudinal section extraction means comprising a piston moving horizontally and driving a hydraulic pump.

The oscillating pressure in the bulge wave drives the piston to and fro with the effect that the said hydraulic fluid is pumped under pressure to a useful output.

Figure 6:
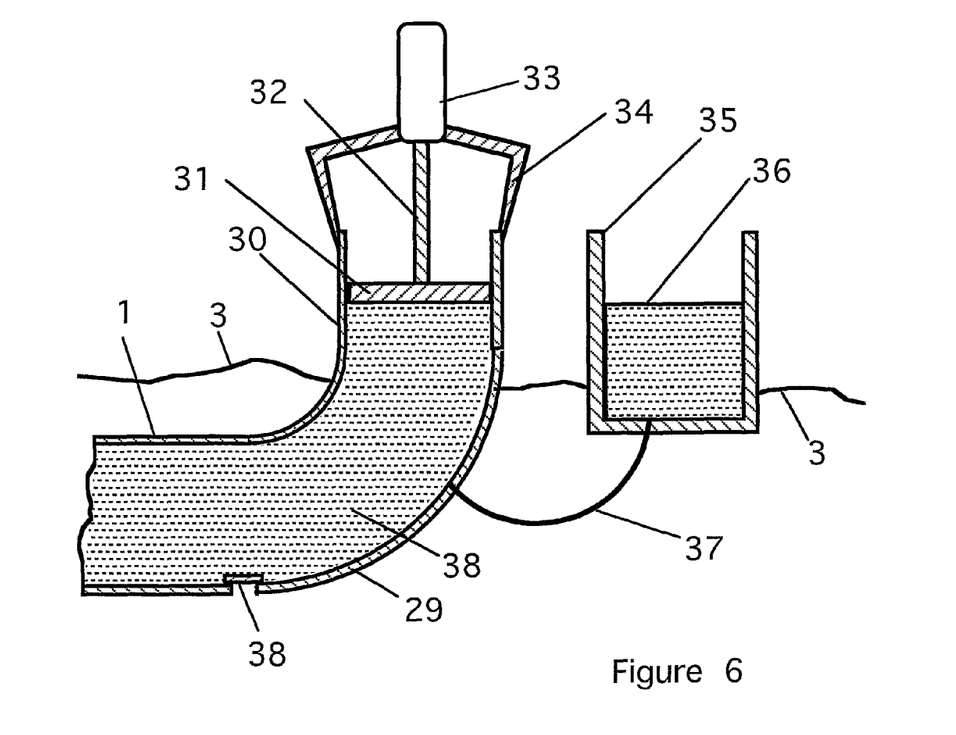
FIG. 6 shows in lateral longitudinal section energy extraction means comprising a piston moving vertically and driving a hydraulic pump.

Another embodiment of the energy extraction means is illustrated by way of example in FIG. 6. In this embodiment the distensible tube 1 is terminated at the stern with a bent tube 29 connected to a rigid cylinder 30 with piston 31 A hydraulic pump 33 is supported for example on an open framework 34 and connected to the piston by means of the connecting rod 32. A reservoir 35 contains water 36 and the water level is maintain above the mean level of the sea by auxiliary pumps (not illustrated). This reservoir is connected to the energy extraction means by a narrow pipe with the effect that the mean water level in the cylinder 30 is maintained substantially above the level of the sea but the pipe is too narrow to pass the bulge wave pressure oscillations to the reservoir. The piston 31 is buoyant and on average floats on the water in the cylinder 30. The rising and falling of the water level in the cylinder 30 under the action of the bulge wave drives the piston to and fro vertically with the effect that useful hydraulic energy is generated by the hydraulic pump 33 and passed to a useful output via connecting pipes (not illustrated) according to the art. In this embodiment, if the wave energy is very high so that the bulge wave is exceptionally large, the piston 31 will rise above the end of the cylinder 30 and water will spill out of the cylinder into the surrounding sea with the effect of relieving the excess pressure in the system and protecting it from damage. The piston will fall back into the cylinder and the lost water will be replaced by water from the reservoir via the pipe 37. If the bulge wave oscillation is of large amplitude the pressure inside the distensible tube may fall below the sea water pressure outside with the effect that the walls of the distensible tube could collapse inwards. To avoid this, the tube may with advantage be furnished with a one-way valve 38 which allows sea water to enter the tube if the pressure inside is lower than outside.

Figure 7:
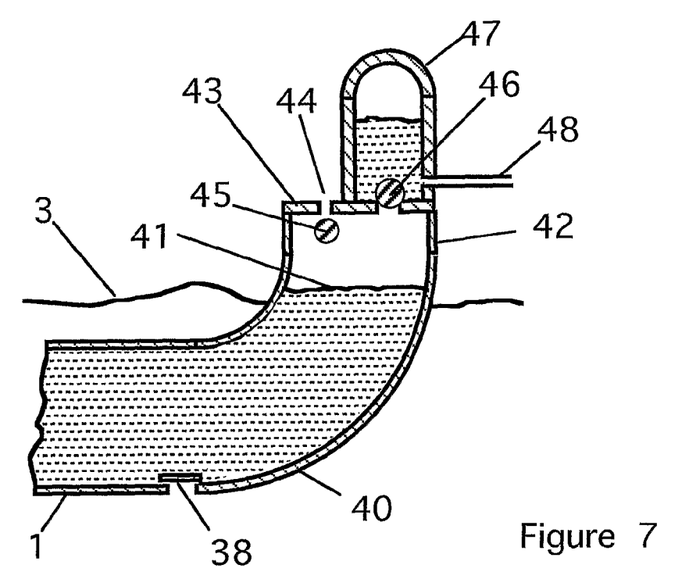
FIG. 7 shows in lateral longitudinal section energy extraction means comprising a hydraulic ram pump driving water at high pressure into a hydraulic accumulator.

Another embodiment of the energy extraction means is illustrated by way of example in FIG. 7. In this embodiment the distensible tube 1 is terminated at the stern by a bend connected to a vertical tube 42. Which is closed at the top close to sea level by a bulkhead 43. Said bulkhead is furnished with a hole 44 fitted with a float valve 45 with the effect that air can flow freely in and out of the tube 42 but water cannot escape. The bulkhead is further furnished with a one-way valve 46 leading to a hydraulic accumulator 47 which contains water under pressure according to the art. In this embodiment the water surface 41 inside the vertical tube 42 is on average more or less the same as in the sea outside but is driven up and down through a large amplitude by the bulge wave inside the tube. As the water surface 42 rises the air above it is vented to the atmosphere via the hole 44; but when the water reaches the bulkhead the float valve closes and a high pressure shock is generated. This forces some water through the one-way valve 46 into the hydraulic accumulator 47 with the effect that energy is captured to the hydraulic accumulator. From the accumulator sea water under pressure may be led off through the pipe 48 to do useful work according to the art. The water thus lost from the tube 42 is replaced from the sea when the pressure in the bulge wave goes negative via the one-way valve 38 substantially as described above. The overall effect of this embodiment is that the bulge waves cause sea water to be pumped at high pressure to a useful output with no moving parts (apart from the float valve and one-way valves). In this embodiment the distensible tube 1 may optionally be open to the sea at the bow.

Figure 8:
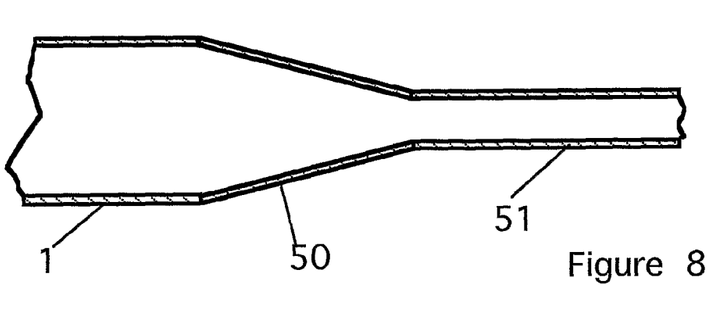
FIG. 8 shows in lateral longitudinal section energy extraction means comprising a transition to a narrow rigid pipe which carries high pressure water ashore.

Another embodiment of the energy extraction means is illustrated by way of example in FIG. 8. In this embodiment the distensible tube 1 is connected to a long rigid output pipe 51 by means of an intermediate transition and matching section 50. Said transition and matching section 50 may comprise several stages (not illustrated) with changes of cross-section and of distensibility with the effect that the bulge wave with comparatively small pressure oscillations and with large longitudinal velocity oscillations is converted without substantial loss or reflection into a wave with high pressure oscillations and low velocities, the latter being more suitable for transmitting energy to shore through a comparatively narrow pipe.

Figure 9:
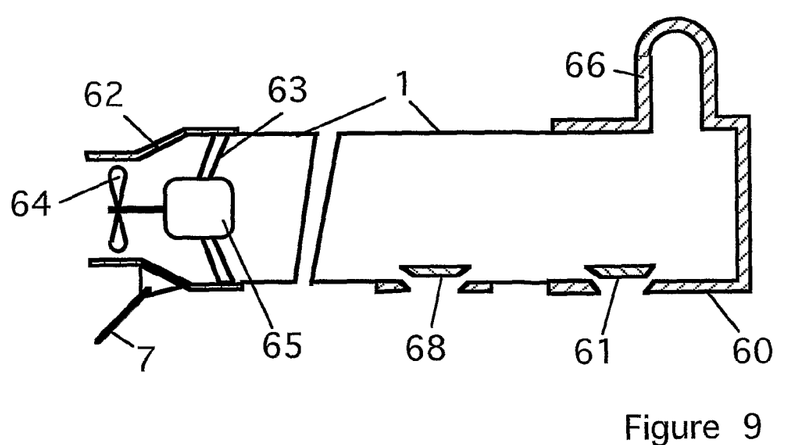
FIG. 9 shows in lateral longitudinal section energy extraction means comprising a one-way valve at the stern of the tube and a turbine at the bow driving an electric generator.

In the embodiment illustrated by way of example in longitudinal side elevation in FIG. 9 the distensible tube 1 is furnished at the stern with a partially distensible end pipe 60 furnished with one or more one-way valves 61 which allow sea water to enter the pipe but not to leave. The tube is further furnished at the bow with a rigid pipe 62 open to the sea and fitted with an internal frame 63 which supports an electric generator 65 and water turbine 64. The operation of the system is as follows. The pressure inside the distensible tube 1 is generally higher than the pressure outside. But during the low pressure phase of the bulge wave arriving at the stern, the pressure in the end pipe 60 is lower than the pressure in the sea with the effect that water is sucked into said end pipe through the one-way valve or valves 61. During the high pressure phase of the bulge wave the one-way valve is closed and water cannot leave the tube. The result is a net intake of water at the stern which maintains the high average pressure in the distensible tube 1 and the result is a more or less uniform flow of water along the tube from stern to bow. Said water flows out into the sea at the bow through the turbine 64 generating electricity according to the art. A mooring 7 serves to hold the device in position. With advantage the end pipe 60 may be furnished with one or more side chambers 66 which may be distensible or rigid and may contain air. Said side chambers have the effect of improving the matching of the bulge wave and smoothing the flow of water to the turbine. In this embodiment the distensible tube 1 may in addition be furnished with a multiplicity of one-way valves 68 dispersed along the length of the tube with the effect of allowing more water to enter the tube at these positions and enhancing the flow through the turbine 64.

Figure 10:
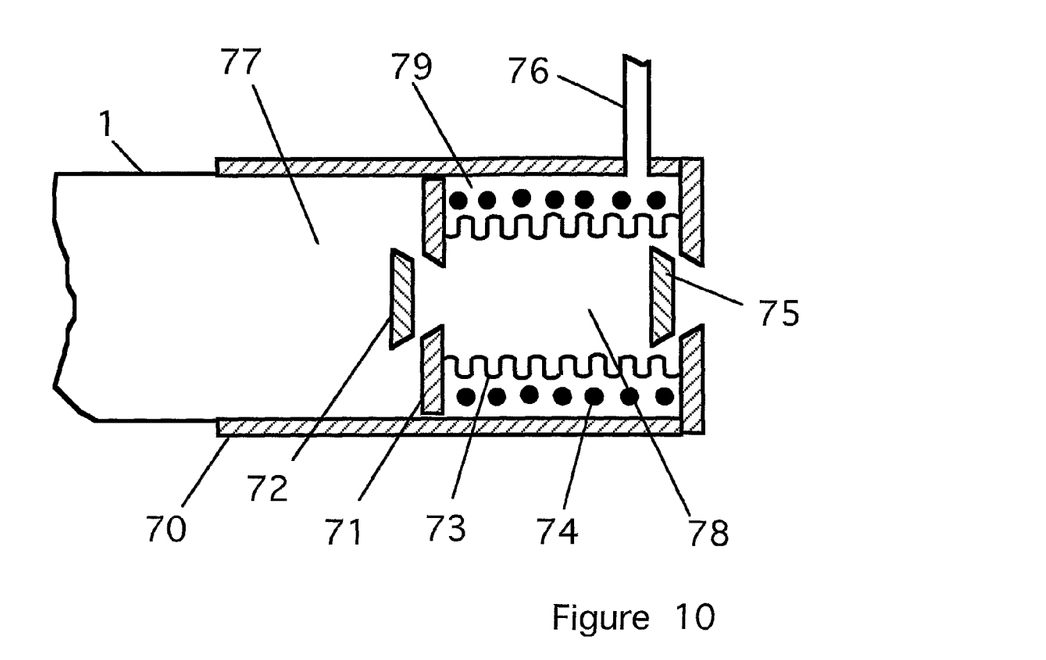
FIG. 10 shows in lateral longitudinal section an improved one-way valve system which may be used with the turbine and electric generator illustrated in FIG. 9.

FIG. 10 shows by way of example in longitudinal lateral cross-section another embodiment of the one-way valve system which may be attached to the stern of the distensible tube or at some position along the length of the tube and used in combination with a turbine at the bow as described with reference to FIG. 9. The purpose of this embodiment is to increase the pressure inside the distensible tube 1 with a view to avoiding any tendency of the tube to collapse inwards. Referring to FIG. 10, in this embodiment the distensible tube 1 is furnished at its stern with a rigid tube 70 with sliding piston 71 which compresses and expands the corrugated bellows 73. The high pressure inside the tube 1 is balanced by the helical spring 74. The space 78 inside the bellows communicates with the interior of the distensible tube 1 through the one-way valve 72 and with the sea via one-way valve 75, while the space between the bellows and the rigid tube 70 may with advantage be vented to the atmosphere via the tube 76. In operation the oscillating pressure in the bulge wave inside the distensible tube 1 drives the piston 71 to and fro. When moving to the left in FIG. 10 it sucks water from the sea via one-way valve 75 into the space 78. When moving to the right it drives the water from space 78 through the one-way valve 72 into the distensible tube 1. In this embodiment the distensible tube 1 is furnished at the bow with a turbine and electric generator substantially as already illustrated and described in relation to FIG. 9 with the effect that the energy of the waves causes water to be pumped through the turbine generating useful electricity. Many other arrangements of pistons may be adopted according to the art with the effect of pumping water at elevated pressure into the distensible tube 1. In particular, there may with advantage be a number of chambers 78, which may be brought into operation in varying numbers, by locking the one-way valves. In this way the minimum bulge wave pressure required to move the piston may be varied, to suit the wave conditions, and other more complex control strategies adopted.

In an alternative embodiment similar to FIG. 9 but not illustrated, the one-way valve 61 at the stern may be reversed, allowing water to leave the end pipe 60 but not to enter and a turbine can be located in this stream of water at the stern. In another alternative instead of passing through a turbine, the flow of water can be directed into an elevated reservoir either in the sea or on land with the effect that water is pumped from the sea to the reservoir. This may be used for example for flushing out estuaries or supplying fish farms.

Figure 11:
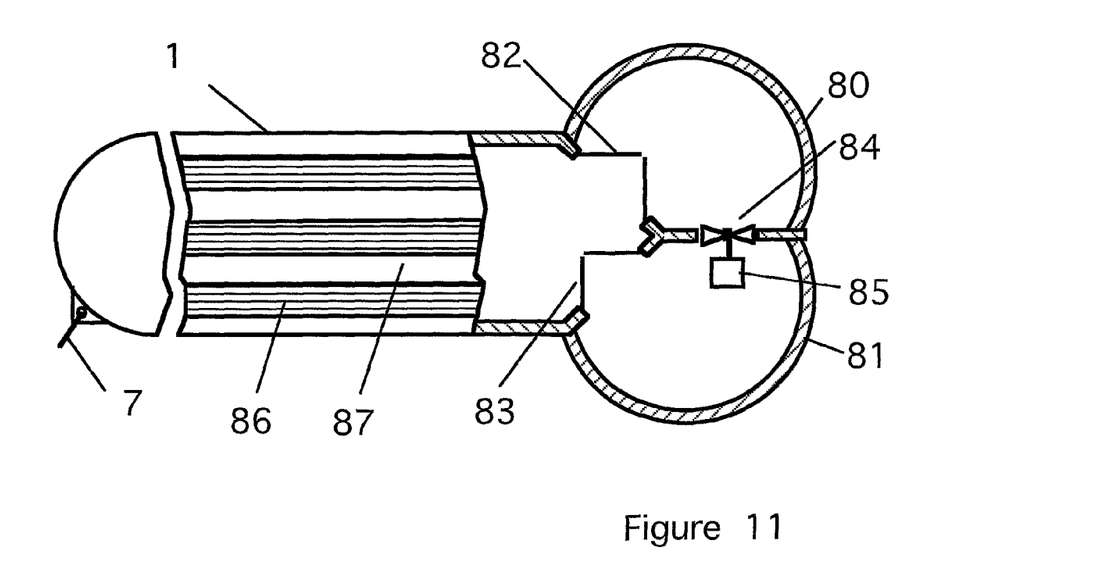
FIG. 11 shows a lateral view partly in section of a distensible tube furnished at the stern with one-way valves communicating with two distensible accumulators with a turbine between them.

FIG. 11 illustrates by way of example the best mode for carrying out the invention. In this embodiment the distensible tube 1 is furnished at the stern with two or more distensible accumulators 80 and 81 which may be of any shape. The one-way valve 82, which may with advantage be a duck billed valve, allows fluid to pass from the distensible tube 1 into the accumulator 80, while the one-way valve 83 allows fluid to pass from the accumulator 81 back into the distensible tube. Fluid can flow from accumulator 80 into accumulator 81 through the turbine 84 which drives the electric generator 85. In operation the bulge wave arriving at the stern of the tube 1, in its high pressure phase drives fluid through the valve 82 into the accumulator 80, and in its low pressure phase sucks fluid out of accumulator 81 into the tube 1. This maintains a pressure difference between the accumulators and gives rise to a more or less steady flow of fluid through the turbine 84 driving the electric generator 85. The distensibility of the accumulators which may with advantage be made of rubber smoothes the flow. The fluid which may be water or other hydraulic fluid thus circulates from the distensible tube 1 through the accumulators 80 and 81 passing through the turbine 84 and back to the tube in a closed circuit, with the advantage that contamination by dirt or marine organisms is avoided. In this embodiment the inertia of the fluid contained in the accumulators reduces movement of the stern of the distensible tube 1 with the effect that the power output is enhanced. The accumulators instead of having distensible walls may comprise inelastic tanks of water, open to the air at the top or closed tanks containing compressible bladders inflated with air under pressure. In this embodiment as illustrated in FIG. 11 the walls of the distensible tube 1 may with advantage comprise alternating parallel longitudinal strips of elastomer 86 interleaved with parallel strips of flexible but inelastic material such as polymer-coated fabric 87 all joined to make a water tight tube, the proportion of elastomer to fabric in the circumference being chosen to achieve the optimum distensibility. The whole wave energy converter, ballasted to float in or near the surface of the sea, is held in position by the mooring cable 7 attached to the bow according to the art.

It will be apparent that some particular features of one of the alternative embodiments described by way of example above may be combined with particular features of another embodiment, all within the scope of the invention.

INDUSTRIAL APPLICABILITY

The invention is intended to be used for extracting useful energy from ocean waves, either as electrical power generated by a turbine-alternator set mounted on board or nearby, or as hydraulic power carried by high pressure fluid pumped by the invention. If the fluid is sea water pumped at high pressure it may be used directly for desalination by reverse osmosis according to the art.

REFERENCES

[1] James Lighthill, Waves in Fluids, Cambridge University Press (1978), p. 96 ff

The invention claimed is:

1. Apparatus for converting the energy of sea surface waves into useful energy, the apparatus comprising:
    an elongate distensible tube for containing water or other liquid of similar density, said tube having opposite ends;
    means for orienting the tube such that in use, with the tube immersed or partially immersed, the tube extends generally in the direction of surface wave propagation;
    energy extraction means at one or both ends of the tube; wherein the distensibility of the tube is such that, in use, the velocity of the propagation of pressure waves along the tube resulting from said surface waves is generally equal to or close to the velocity of propagation of said surface waves so that the energy of said surface waves may be transferred to a bulge wave in said water or other liquid contained in the tube from which useful energy may be extracted by the energy extraction means.

2. Apparatus as claimed in claim 1, wherein the tube has one or more walls, said wall(s) being elastic or partially elastic.

3. Apparatus as claimed in claim 1, wherein the tube has one or more walls that extend around a circumference of the tube, said wall(s) being in one part of the circumference elastic and in another part of the circumference flexible but inelastic.

4. Apparatus as claimed in claim 3, wherein the wall of the tube comprises parallel longitudinal strips of rubber interleaved with parallel longitudinal strips of flexible inelastic material.

5. Apparatus as claimed in claim 1, wherein the tube has corrugated or elliptical walls.

6. Apparatus as claimed in claim 1, wherein the tube has walls, said walls comprising a reticulated structure of flexible or elastic material enclosing spaces which are inflated with compressed air or other fluid.

7. Apparatus as claimed in claim 1, wherein the tube has walls, said walls comprising internal spaces which may be inflated with air or other fluid with the effect that the distensibility of the tube may be adjusted.

8. Apparatus as claimed in claim 1, wherein the distensibility of the tube varies along the length of the tube.

9. Apparatus as claimed in claim 8, wherein the cross-sectional shape or cross-sectional size of the tube, and consequentially the distensibility of the tube, varies along the length of the tube.

10. Apparatus as claimed in claim 1, further comprising floatation means such that the tube will float close to the surface of the sea.

11. Apparatus as claimed in claim 1, including ballast attached to the tube so that the tube will rest on or close to the sea bed.

12. Apparatus as claimed in claim 1, wherein the energy extraction means comprises a piston moving in a cylinder.

13. Apparatus as claimed in claim 1, wherein the energy extraction means comprises a chamber with an air vent with float valve and a one-way valve communicating with a hydraulic accumulator with the effect that water is pumped at high pressure into the accumulator.

14. Apparatus as claimed in claim 1, wherein the energy extraction means comprises a weir or one-way valve with the effect that water is pumped into an elevated reservoir.

15. Apparatus as claimed in claim 1, wherein the energy extraction means comprises one or more one-way valves at the stern of the tube and a water turbine connected to the tube at the bow or stern directly or indirectly driving an electric generator.

16. Apparatus as claimed in claim 1, wherein the energy extraction means comprises two or more one-way valves at the stern of the tube communicating with two or more distensible accumulators with a water turbine between the accumulators directly or indirectly driving an electric generator.

17. A method for converting the energy of sea surface waves into useful energy, using an apparatus comprising an elongate distensible tube having opposite ends and an energy extraction means at one or both ends of the tube, the tube containing water or other liquid of similar density, the method comprising the steps of:
    immersing or partially immersing the tube in the sea;
    orienting the tube within the sea such that the tube extends generally in the direction of sea surface waves, the distensibility of the tube being such that the velocity of the propagation of pressure waves along the tube resulting from said surface waves is generally equal to or close to the velocity of propagation of the waves so that energy of the waves may be transferred to bulge waves within the tube; and
    using the energy extraction means to extract useful energy from the bulge waves.

18. A method as claimed in claim 17, wherein the tube is completely filed with said water or other liquid.

19. A method as claimed in claim 17, wherein the tube is positioned on the sea bed.

20. A method as claimed in claim 17, wherein the tube is provided with buoyancy such that it floats just below the sea surface.

* * * * *